Patented May 8, 1928.

1,669,281

UNITED STATES PATENT OFFICE.

WILLIAM BREITZKE, OF DETROIT, MICHIGAN.

METAL-POLISHING COMPOSITION.

No Drawing. Application filed March 11, 1927. Serial No. 174,711.

This invention relates to a metal polishing composition. It is particularly applicable to aluminium ware but may be employed also on coated or sterling ware to advantage. Aluminium is a peculiar metal in the respect that it forms an invisible oxide of alumina on its surface when exposed to moist air. This coating of oxide is protective against deeper films of oxidation but has the effect, although not apparent to the eye, of tarnishing its luster and therefore giving highly polished household ware a dull appearance. I have developed a composition which may be applied as a liquid to polished ware, which by brisk friction of a soft cloth leaves a film of protective coating on the surface which restores the high polish of the factory and lasts for a considerable time.

I have found that a composition of camphor, confectioner's sugar, and ether leaves a film which restores the polish and is enduring. The proportions in which I prefer to combine these ingredients are in the ratio of 26 parts of camphor, 68 parts of confectioner's sugar, and 6 parts of ether. The camphor is broken up and the ether applied, and sufficient distilled water added with sugar to form a fluid consistency. The composition is inclosed in an air-tight bottle or other container.

In applying the material, sufficient of the composition may be applied to the surface of the tarnished metallic articles to form a film over the surface when briskly rubbed with a soft cloth. The effect of the friction forms over the polished surface, especially in soft metals such as aluminium, a very thin protective film of camphor and glucose, which prevents the penetration of air containing moisture rendering the film effective for a long time. I think the camphor content is largely responsible for the resistance of moist penetration, but whatever the reactions under exposure to atmospheric air the compound has been demonstrated to be particularly effective for preserving and restoring a polish which remains effective for a considerable period of time. The ether is a highly detergent material removing any greasy compound which may have become attached to the surface, and the sugar conduces to the formation of a good and lasting film and assists in reducing the film of oxide under the heat of friction.

I have described a particular percentage of relative proportions, but the same may be varied more or less without destroying the efficacy of the composition. I believe the proportions given give the best results.

What I claim is:

1. A metal polish composed of a paste of confectioner's sugar in major content, a minor content of camphor, and a small content of ether, formed into a paste with water.

2. A polishing material for soft metals composed of a paste of camphor 26 parts, confectioner's sugar 68 parts, ether 6 parts, and water sufficient to form a stiff paste.

In testimony whereof I affix my signature.

WILLIAM BREITZKE.